(12) United States Patent
Lussier et al.

(10) Patent No.: US 8,672,609 B2
(45) Date of Patent: Mar. 18, 2014

(54) COMPOSITE FAN CONTAINMENT CASE ASSEMBLY

(75) Inventors: Darin S. Lussier, Berlin, CT (US); Thomas J. Robertson, Jr., Glastonbury, CT (US); Mark W. Costa, Storrs, CT (US); Sreenivasa R. Voleti, Farmington, CT (US); Rajiv A. Naik, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/397,771

(22) Filed: Feb. 16, 2012

(65) Prior Publication Data

US 2012/0148392 A1    Jun. 14, 2012

Related U.S. Application Data (63) Continuation-in-part of application No. 12/551,018, filed on Aug. 31, 2009, and a continuation-in-part of application No. 12/636,388, filed on Dec. 11, 2009, and a continuation-in-part of application No. 12/892,037, filed on Sep. 28, 2010, and a continuation-in-part of application No. 12/912,189, filed on Oct. 26, 2010, and a continuation-in-part of application No. 12/986,209, filed on Jan. 7, 2011, and a continuation-in-part of application No. 13/024,386, filed on Feb. 10, 2011.

(51) Int. Cl.
*F01D 25/28* (2006.01)

(52) U.S. Cl.
USPC .................. 415/9; 415/197; 415/200

(58) Field of Classification Search
USPC ................ 415/9, 173.4, 174.4, 196, 197, 200
See application file for complete search history.

(56) References Cited

U.S. PATENT DOCUMENTS

| | | | |
|---|---|---|---|
| 4,940,386 A | | 7/1990 | Feuvrier et al. |
| 5,054,282 A | | 10/1991 | Costa et al. |
| 2,095,617 A | | 3/1992 | Costa et al. |
| 5,160,248 A | | 11/1992 | Clarke |
| 5,267,828 A | * | 12/1993 | Lenhart et al. ............ 415/9 |
| 5,344,280 A | | 9/1994 | Langenbrunner et al. |
| 5,387,092 A | | 2/1995 | Pettitt et al. |

(Continued)

FOREIGN PATENT DOCUMENTS

JP          2011256829 A      12/2011

OTHER PUBLICATIONS

DuPont Launches Kevlar XP for Hard Armor Applications, http://www/prweb.com/releases/dupont/hard-armor-applications/prweb4682244.

(Continued)

*Primary Examiner* — Edward Look
*Assistant Examiner* — Woody A Lee, Jr.
(74) *Attorney, Agent, or Firm* — Carlson, Gaskey & Olds, P.C.

(57) ABSTRACT

A fan case for a gas turbine engine includes a composite fan containment case having an outer surface, a front and a rear. An attachment flange and a mounting ring are respectively provided on the front and the rear. A bolt attachment is supported on the outer surface. The composite fan containment case has a containment area that is configured to be axially aligned with a fan blade. A ballistic liner is arranged in the containment area.

6 Claims, 6 Drawing Sheets

(56) References Cited

U.S. PATENT DOCUMENTS

| | | | |
|---|---|---|---|
| 5,431,532 A | 7/1995 | Humke et al. | |
| 5,823,739 A | 10/1998 | Van Duyn | |
| 5,876,651 A | 3/1999 | Blackburn, Jr. et al. | |
| 5,887,332 A | 3/1999 | Champenois et al. | |
| 6,059,524 A | 5/2000 | Costa et al. | |
| 6,132,857 A | 10/2000 | Champenois et al. | |
| 6,146,089 A | 11/2000 | Allen et al. | |
| 6,149,380 A | 11/2000 | Kuzniar et al. | |
| 6,206,631 B1 | 3/2001 | Schilling | |
| 6,217,277 B1 | 4/2001 | Liu et al. | |
| 6,382,905 B1 | 5/2002 | Czachor et al. | |
| 6,394,746 B1 | 5/2002 | Sathianathan et al. | |
| 6,637,186 B1 | 10/2003 | Van Duyn | |
| 6,638,008 B2 | 10/2003 | Sathianathan et al. | |
| 6,652,222 B1 | 11/2003 | Wojtyczka et al. | |
| 6,814,541 B2 | 11/2004 | Evans et al. | |
| 6,913,436 B2 | 7/2005 | McMillan et al. | |
| 7,076,942 B2 | 7/2006 | Schreiber | |
| 7,087,296 B2 | 8/2006 | Porter | |
| 7,246,990 B2 | 7/2007 | Xie et al. | |
| 7,266,941 B2 | 9/2007 | Eleftheriou et al. | |
| 7,296,655 B2 | 11/2007 | Costa et al. | |
| 7,296,656 B2 | 11/2007 | Sanicki et al. | |
| 7,328,771 B2 | 2/2008 | Costa et al. | |
| 7,357,547 B2 | 4/2008 | King et al. | |
| 7,370,467 B2 | 5/2008 | Eleftheriou et al. | |
| 7,517,184 B2 | 4/2009 | Costa et al. | |
| 7,845,158 B2 * | 12/2010 | Udall | 60/226.1 |
| 7,866,939 B2 | 1/2011 | Harper et al. | |
| 8,021,102 B2 * | 9/2011 | Xie et al. | 415/9 |
| 8,079,773 B2 * | 12/2011 | Blanton | 403/335 |
| 2006/0059889 A1 | 3/2006 | Cardarella, Jr. | |
| 2007/0163229 A1 | 7/2007 | Prasad et al. | |
| 2008/0063508 A1 | 3/2008 | Barnett et al. | |
| 2008/0092362 A1 | 4/2008 | Costa et al. | |
| 2008/0095590 A1 | 4/2008 | Costa et al. | |
| 2008/0115454 A1 | 5/2008 | Xie | |
| 2008/0199301 A1 | 8/2008 | Cardarella Jr | |
| 2008/0232951 A1 | 9/2008 | Cardarella | |
| 2009/0010755 A1 * | 1/2009 | Keller et al. | 415/197 |
| 2009/0067979 A1 | 3/2009 | Braley et al. | |
| 2009/0098337 A1 | 4/2009 | Xie et al. | |
| 2009/0226310 A1 | 9/2009 | Finn et al. | |
| 2010/0078259 A1 * | 4/2010 | Stevenson et al. | 181/290 |
| 2011/0052383 A1 | 3/2011 | Lussier | |
| 2011/0138769 A1 | 6/2011 | Costa et al. | |
| 2012/0034076 A1 | 2/2012 | Xie | |

OTHER PUBLICATIONS

U.S. Appl. No. 12/986,209, filed Jan. 7, 2011 "Attachment of Threaded Holes to Composite Fan Case".
U.S. Appl. No. 12/912,189, filed Oct. 26, 2010 "Fan Case and Mount Ring Snap Fit Assembly".
U.S. Appl. No. 12/892,037, filed Sep. 28, 2010 "Metallic Radius Block for Composite Flange".
U.S. Appl. No. 13/024,386, filed Feb. 10, 2011 "Case With Ballistic Liner".
International Search Report and Written Opinion for International Application No. PCT/US2013/025690 completed on Oct. 22, 2013.

* cited by examiner

COMPOSITE FAN CONTAINMENT CASE ASSEMBLY

This disclosure is a continuation-in-part of U.S. patent application Ser. Nos. 12/551,018 filed Aug. 31, 2009; 12/636,388 filed Dec. 11, 2009; 12/892,037 filed Sep. 28, 2010; 12/912,189 filed Oct. 26, 2010; 12/986,209 filed Jan. 7, 2011; and 13/024,386 filed Feb. 10, 2011.

BACKGROUND

This disclosure pertains to a composite fan containment case for a gas turbine engine.

A gas turbine engine may include a fan section containing fan blades that are surrounded by a fan case supported within a nacelle. The function of the fan case is to contain fractured and separated parts of the fan blades in a radial direction. Metallic fan cases can be undesirably heavy to perform this containment function. A composite fan case constructed of non-metallic materials can reduce weight and provide the same containment capability as a metallic fan case.

While these fan cases have many desirable characteristics, one challenge is the components must be attached to the outer periphery of the case, typically through threaded fasteners. However, the material utilized to form the fan case has not been accommodating of bolt holes. Moreover, composite material manufacturing and forming techniques are limited in the range of tolerances that can be reliably obtained.

SUMMARY

In one example, a fan case for a gas turbine engine includes a composite fan containment case including an outer surface, a front and a rear. An attachment flange and a mounting ring are respectively provided on the front and the rear. A bolt attachment is supported on the outer surface. The composite fan containment case has a containment shell providing an outer case in a containment area that is configured to be aligned with a fan blade. A ballistic liner is arranged in the containment area inward of the outer case.

In a further embodiment of the above, the fan containment case includes multiple composite layers that define a generally cylindrical case. An attachment flange extends radially outward from the cylindrical case at the front. The attachment flange comprises a portion of the composite layers. A metallic backing is secured to the attachment flange.

In a further embodiment of any of the above, the mounting ring is metallic and is secured to the outer surface at the rear.

In a further embodiment of any of the above, the composite fan containment case includes multiple composite layers that define a generally cylindrical case. The mounting ring is integral with the composite layers.

In a further embodiment of any of the above, the bolt attachment includes an internal composite boss having at least one metallic insert. The boss is attached to the outer surface with at least one fiber reinforce ply and an adhesive.

In a further embodiment of any of the above, the ballistic liner is manufactured from one of a resin impregnated KEVLAR, a ceramic material and a metallic material.

In another example, a fan case for a gas turbine engine includes a composite fan containment case including an outer surface, a front and a rear. An attachment flange and a mounting ring are respectively provided on the front and the rear. A bolt attachment is supported on the outer surface.

In a further embodiment of the above, the composite fan containment case includes multiple composite layers defining a generally cylindrical case. An attachment flange extends radially outward from the cylindrical case at the front. The attachment flange includes a portion of the composite layers, and a metallic backing ring is secured to the attachment flange.

In a further embodiment of any of the above, the mounting ring is metallic and is secured to the outer surface at the rear.

In a further embodiment of any of the above, the composite fan containment case includes multiple composite layers defining a generally cylindrical case. The mounting ring is integral with the composite layers.

In a further embodiment of any of the above, the bolt attachment includes an internal composite boss having at least one metallic insert. The boss is attached to the outer surface with at least one fiber reinforce ply and an adhesive.

BRIEF DESCRIPTION OF THE DRAWINGS

The disclosure can be further understood by reference to the following detailed description when considered in connection with the accompanying drawings wherein.

DETAILED DESCRIPTION

Figure 1:
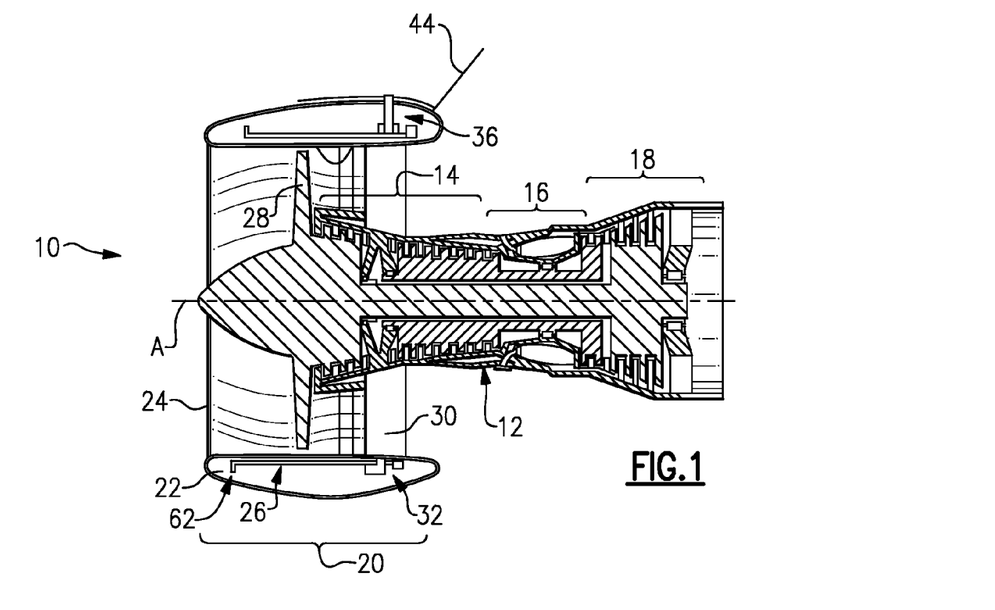
FIG. 1 is a schematic view of an example gas turbine engine.

Referring to FIG. 1, a gas turbine engine is schematically indicated at 10 and includes a core 12 having a compressor section 14, a combustion section 16 and a turbine section 18. The example gas turbine engine 10 includes a fan section 20 that is disposed within a nacelle 22 and includes a plurality of blades 28. The compressor, combustion, turbine, and fan sections 14, 16, 18 and 20 are arranged about an axis A. The nacelle 22 defines an inlet 24 for incoming airflow. A fan containment case 26 is disposed proximate to the blades 28 within the fan section 20.

Figure 2:
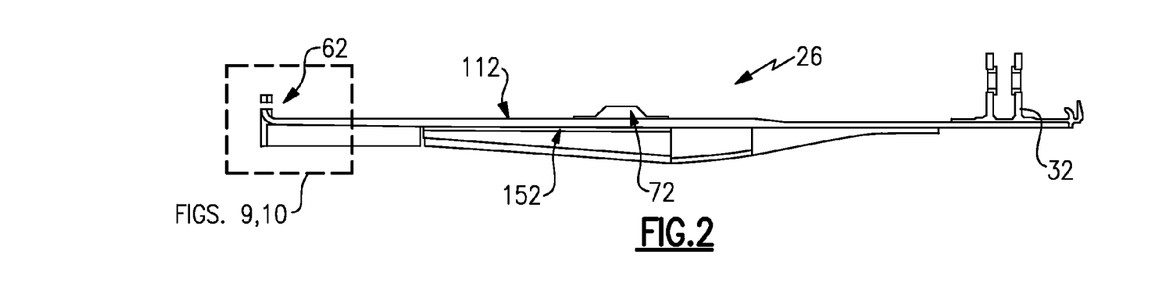
FIG. 2 is a cross-sectional view through the containment case shown in FIG. 3 taken along line 2-2.
Figure 3:
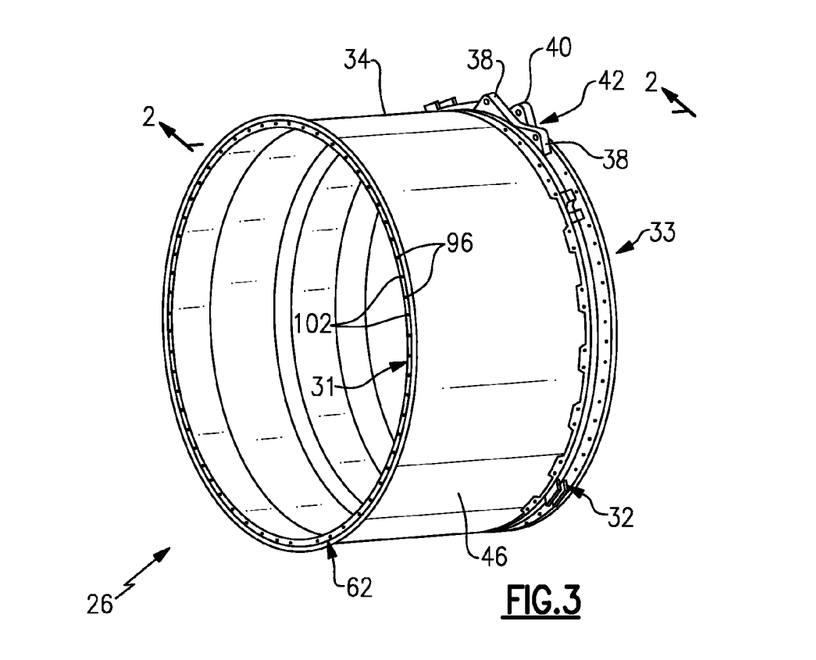
FIG. 3 is a perspective view of an example containment case.

Referring to FIGS. 2 and 3, the example fan containment case 26 includes attachment features and containment features for a composite containment structure. A mounting ring 32 is provided at the rear 33 of the fan containment case 26, and an attachment flange 62 is provided at its front 31, for securing the fan containment case 26 relative to other engine structure. Bolt attachments 72 are provided on the fan containment case 26 for supporting components on the fan containment case 26. The containment features include a composite containment shell 112 and a ballistic liner 152. These attachment and containment features are fully set forth in patent applications to which this disclosure claims priority, and Applicant hereby incorporates by reference the entirety of U.S. patent application Ser. Nos. 12/551,018 filed Aug. 31, 2009; 12/636,388 filed Dec. 11, 2009; 12/892,037 filed Sep. 28, 2010; 12/912,189 filed Oct. 26, 2010; 12/986,209 filed Jan. 7, 2011; and 13/024,386 filed Feb. 10, 2011.

Returning to FIG. 1, the example containment case includes the mount ring 32 attached to a mount beam 36 attached to a frame member such as a pylon 44 of an aircraft. The mount ring 32 is also attached to at least one guide vane section 30 that extends from the engine core 12 to the containment case 26. The example containment case 26 includes the mount ring 32 that supports a portion of the engine core 12. The guide vanes 30 that are disposed rearward of the fan section 20 are static relative to the rotating blades 28 and provide one of several mounting locations that support the engine core 12.

Referring to FIG. 3, in one example the mount ring 32 is secured onto an outer surface 34 of the aft end of the fan case 30 and overlaps a portion of the outer surface 34 of the composite containment case 30. The mount ring 32 includes one or more mounting flanges 42. The example mounting flange 42 extends radially outward from the mount ring 32 to provide a connection to the forward primary engine mount beam 36. The example mounting flange 42 includes a fail safe lug 40 that extends upward between primary lugs 38. The mounting flange 42 corresponds to a configuration of the engine mount beam 36 for securing the engine core 12 to the pylon 44 of the aircraft. As appreciated other mounting flange configurations could be utilized with contemplation of this disclosure, for example, as illustrated in FIG. 4.

Figure 4:
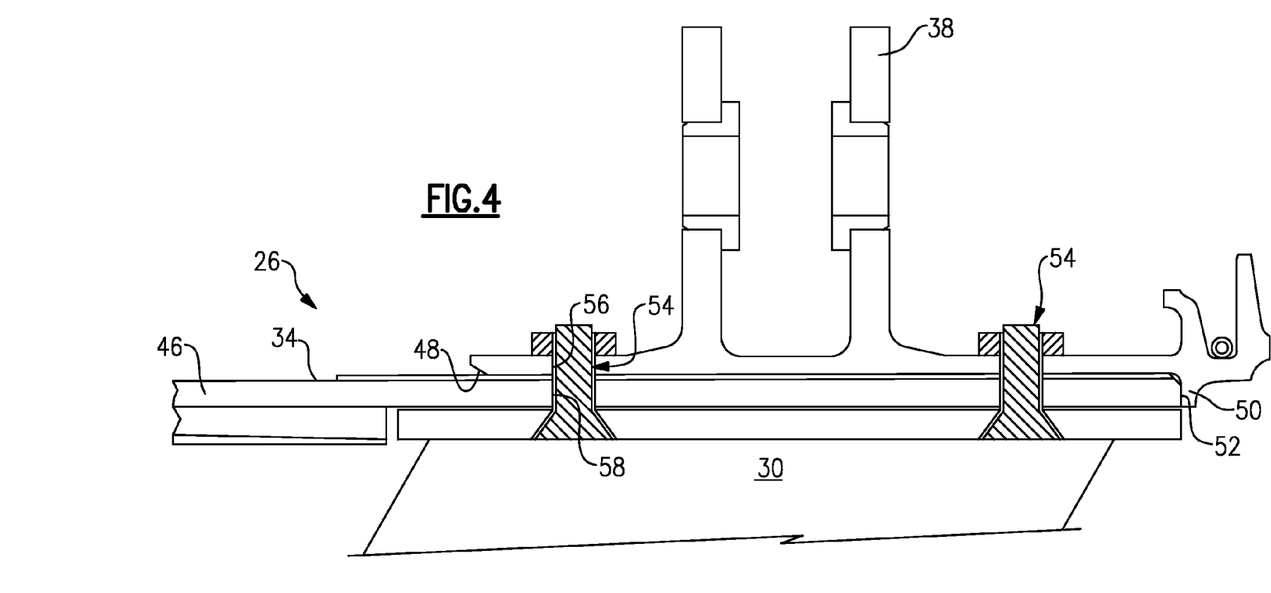
FIG. 4 is an enlarged cross-sectional view of the containment case and mount ring.

Referring to FIG. 4 with continued reference to FIG. 3, the example fan containment case 26 includes structure 46 comprised of a plurality of composite layers forming the generally cylindrical geometry of the fan containment case 26. The mount ring 32 fits over the outer surface 34 of the fan containment case 26 and is a forged ring of metal material in one example. The example mount ring 32 includes a lead in chamfer 48 that aids in guiding the mount ring 32 over the fan case 30 during assembly. The mount ring 32 also includes an axial locating feature for installation. The example axial locating feature is a tab 50 that extends radially inward to abut a back end 52 of the composite structure 46. The mount ring 32 is slid onto the outer surface 34 to abut the tab 50 against the back end 52.

Once the mount ring 32 is positioned on the fan case 30, fasteners 54 are arranged through openings 56 within the mount ring 32 and openings 58 in the composite structure 46 to attach the mount ring 32 and the composite structure 46 to the fan exit guide vanes 30. The combination of the interference fit along with the plurality of fasteners 54 secure the mount ring 32 to the composite structure 46. Further, the mount ring 32 is secured to the engine core 12 by way of the guide vanes 30.

Figure 5:
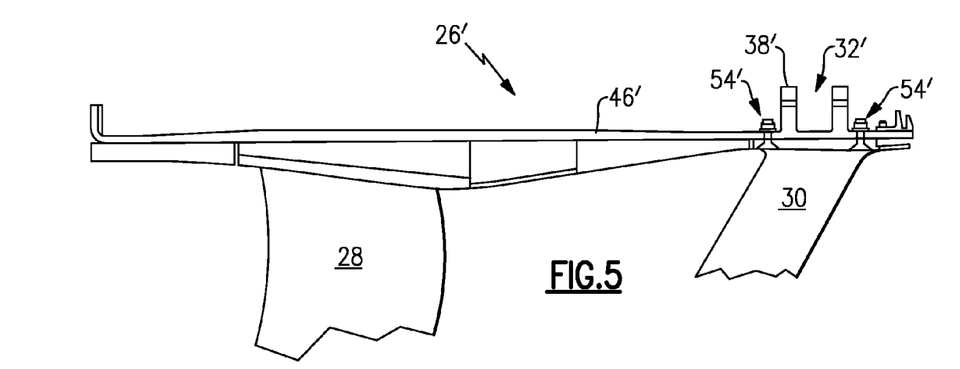
FIG. 5 is a cross-sectional view of another example containment case and mount ring.

Referring to FIG. 5, another fan containment case 26' is shown with a mount ring 32' that is integral with the composite structure 46'. The term "integral" means the mount ring 32' and the composite structure 46' are formed as a single unit. The fan exit guide vanes 30 are secured to the composite structure 46' by fasteners 54' arranged on either axial side of the primary lugs 38'.

Figure 6:
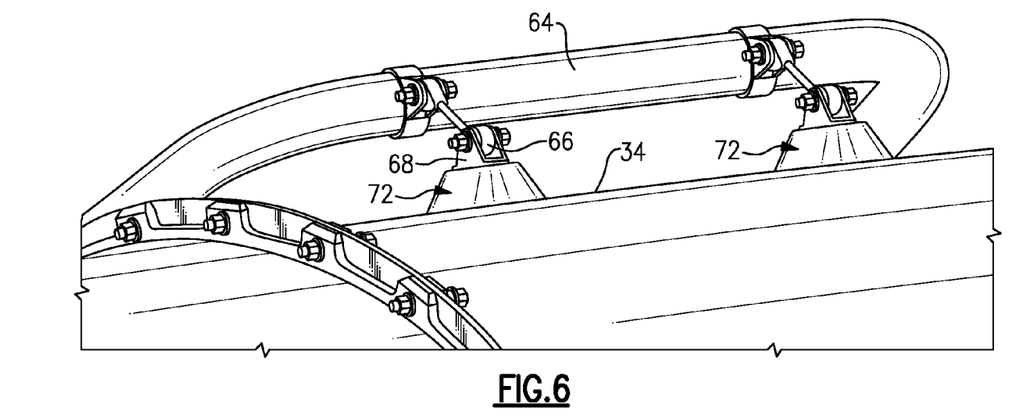
FIG. 6 is a perspective view of a component supported by a containment case attachment.

Another attachment feature of the fan containment case 26 is illustrated in FIG. 6. The fan containment case 26 has threaded bolt attachments 72 are mounted on the outer surface 34. A component 64 is attached to the attachments 72, such as through pins 66 mounted at a bracket 68. In the example, the component 64 is a fluid tube. Any number of other components, and types of mountings may benefit from the present invention. The bracket 68 is threadingly attached, such as by bolts 70 (see FIG. 7), to the attachment 72.

Figure 7:
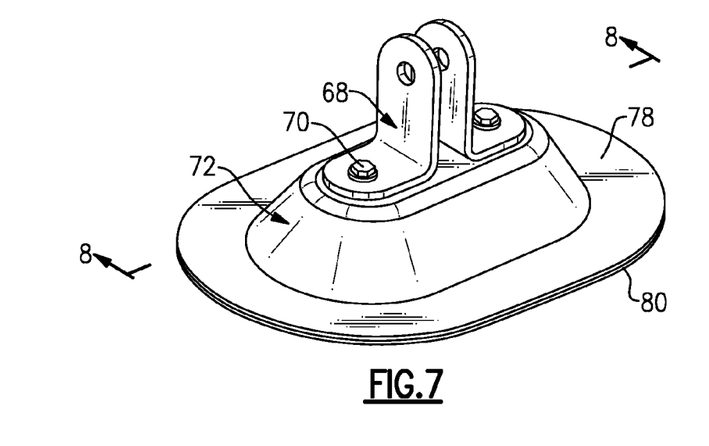
FIG. 7 is an enlarged perspective view of the attachment shown in FIG. 6.
Figure 8:
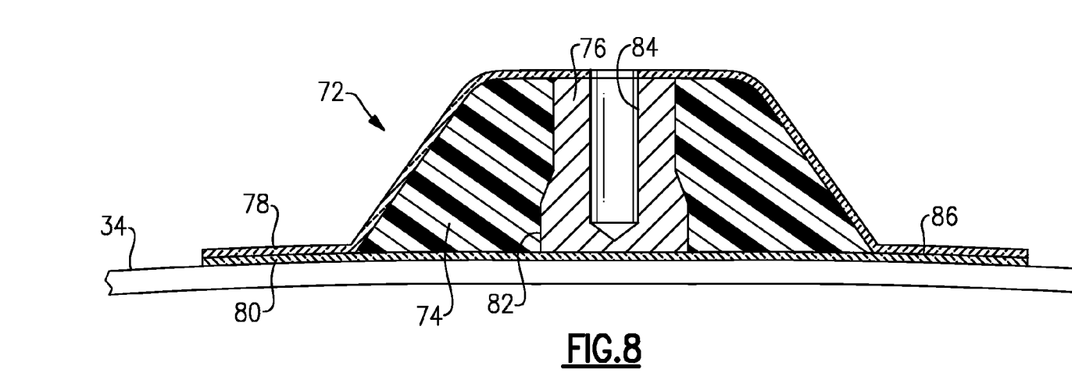
FIG. 8 is a cross-sectional view of the attachment shown in FIG. 7 taken along line 8-8.

FIGS. 7 and 8 show a detail of the attachment 72, which includes a molded conical boss which may be formed of a composite material 74 arranged between multiple plies 78, 80. The boss may be any number of different shapes including rectangular, square, oval, etc. Metallic inserts 76 are embedded within the composite material 74. A combination of one or more plies and adhesive 86 are attached to the outer surface of the composite material 74. This combination will be attached to the outer surface 34 of the composite fan containment case 26. The insert 76 has flat ends 82, which prevent rotation within the composite material 74. A portion of the insert includes a hole 84, which will receive a threaded insert (not shown), in one example.

Figure 9:
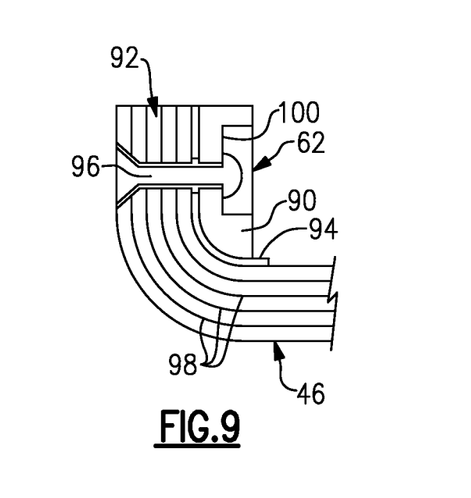
FIG. 9 is a cross-sectional view of a containment case attachment flange through a fastening element.
Figure 10:
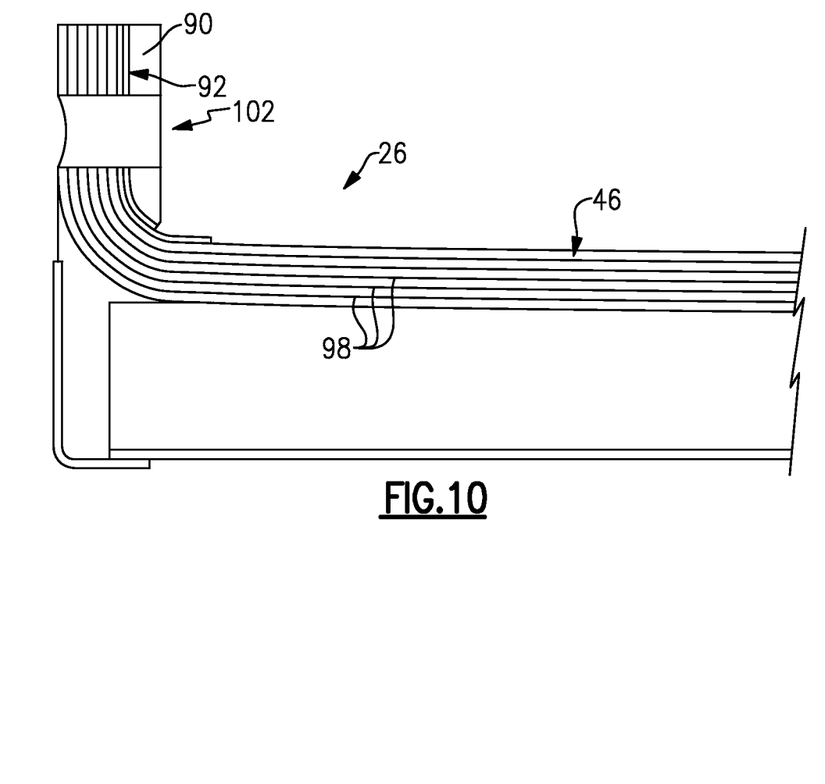
FIG. 10 is a cross-sectional view of the containment case attachment flange shown in FIG. 9, but through an attaching hole.

Referring to FIGS. 9 and 10 with continued reference to FIG. 3, an example metallic backing 90 is secured to a forward flange portion 92 of the composite structure 46 with an adhesive 94 and/or mechanical fasteners 96 to provide the attachment flange 62. The composite structure 46 includes multiple layers 98. The example mechanical fasteners 96 comprise rivets that extend through the metallic backing 90 and into the forward flange portion 92. The metallic backing 90 includes counter-bore holes 100 that receive the entire head of the rivet 96 such that the rivet head does protrude from the metallic backing 90. The metallic backing 90 and the composite structure 46 define holes 102 for fasteners utilized to secure the containment case 26 within the nacelle 22. The metallic backing 90 includes a radius that corresponds to the radius of the composite structure 46.

Figure 11:
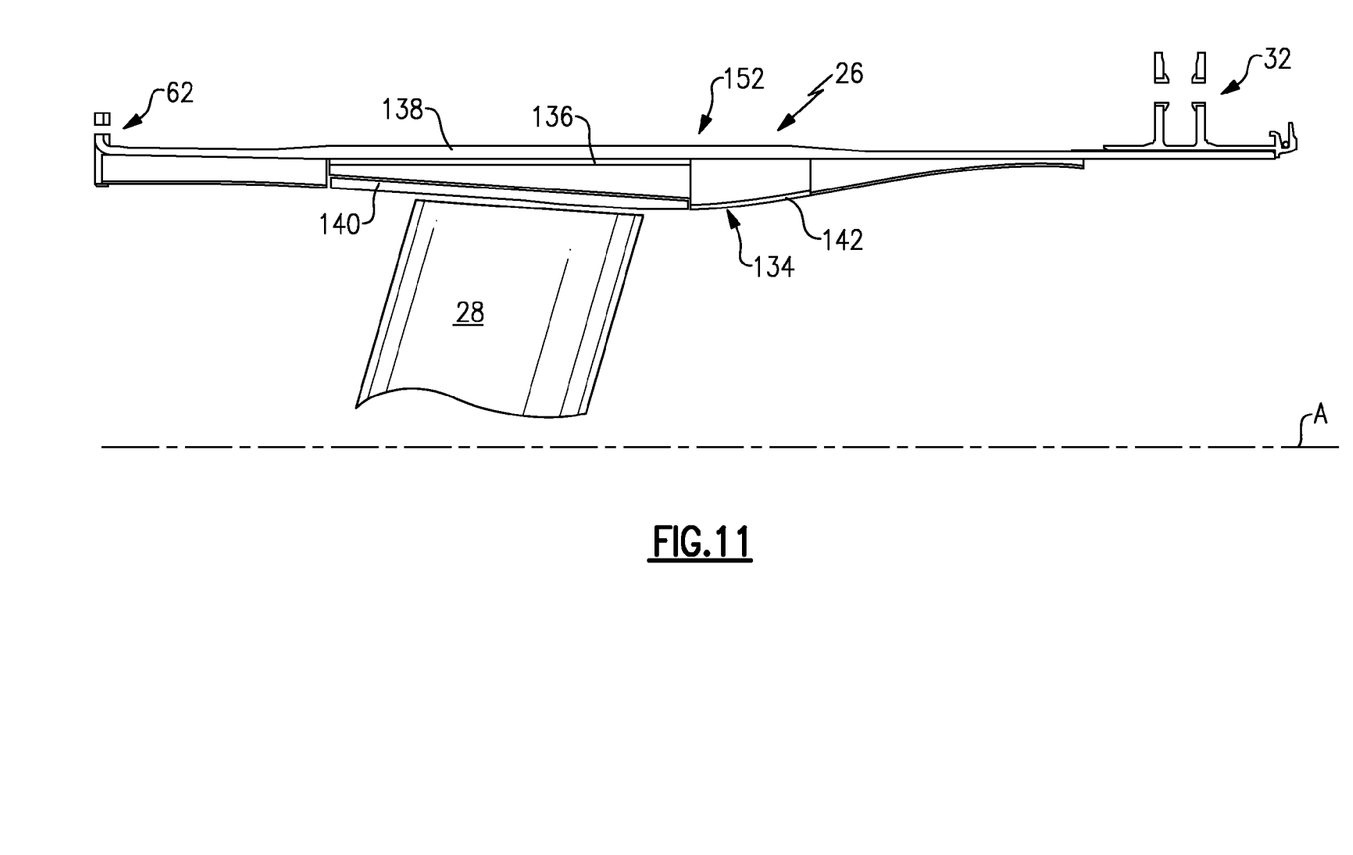
FIG. 11 is an enlarged cross-sectional view of blade containment feature of the containment case.

With reference to FIG. 11, the fan containment case 26 includes an inner structure 134, a ballistic liner 136, and the outer case 138 defined about the axis A. The inner structure 134 may include an abradable layer 140 and a honeycomb structure 142. The abradable layer 140 provides close tolerances to be maintained between the fan blade tips and the inner structure 134. The honeycomb structure 142 provides acoustic dampening as well as the potential for retention of smaller blade fragments. It should be understood that the inner structure 134 is light weight and provides minimal, if any, resistance to blade fragment penetration.

In one example, the ballistic liner 136 is a cylindrical shell of a rigid material such as a resin impregnated KEVLAR material such as KEVLAR XP™ for Hard Armor, LEXAN, metallic structures, or ceramic materials. That is, the ballistic liner 136 is hard and operates as a rigid impact liner on the radially inner surface of the outer case 138 which may be manufactured of a composite material such as a carbon composite. The ballistic liner 136 need only extend a relatively short axial length as the hard ballistic liner 136 is radially located directly outboard of the fan blades 28.

In another example, the ballistic liner 136 generally includes a plurality of unidirectional roving fiber layers and a plurality of non-crimp fabric layers as described in Applicant's co-pending application entitled "Case with Ballistic Liner," filed on the same date as the present application and which is incorporated by reference in its entirety. Generally, each of the plurality of unidirectional roving fiber layers is about half the thickness of each of the plurality of non-crimp fabric layers. In one embodiment, each of the plurality of unidirectional roving fiber layers includes three plies and each of the plurality of non-crimp fabric layers includes two plies in the ballistic liner 136.

Although example embodiments have been disclosed, a worker of ordinary skill in this art would recognize that certain modifications would come within the scope of the claims.

For that reason, the following claims should be studied to determine their true scope and content.

What is claimed is:

1. A fan case for a gas turbine engine comprising:
a composite fan containment case including an outer surface, a front and a rear;
an attachment flange and a mounting ring respectively provided on the front and the rear;
a bolt attachment supported on the outer surface, the bolt attachment includes an internal composite boss having at least one insert, the boss attached to the outer surface with at least one fiber reinforce ply and an adhesive, the insert includes a threaded hole, wherein the insert is metallic and includes a flat end that prevents rotation of the insert within the composite boss; and
wherein the composite fan containment case has a containment shell providing an outer case in a containment area configured to be aligned with a fan blade, and a ballistic liner arranged in the containment area inward of the outer case.

2. The fan case according to claim 1, wherein the composite fan containment case includes multiple composite layers defining a generally cylindrical case, an attachment flange extending radially outward from the cylindrical case at the front, the attachment flange comprising a portion of the composite layers, and a metallic backing ring secured to the attachment flange.

3. The fan case according to claim 1, wherein the mounting ring is metallic and is secured to the outer surface at the rear.

4. The fan case according to claim 1, wherein the composite fan containment case includes multiple composite layers defining a generally cylindrical case, and the mounting ring is integral with the composite layers.

5. The fan case according to claim 1, wherein the ballistic liner is manufactured from one of a resin impregnated para-aramid fibers, a ceramic material and a metallic material.

6. A fan case for a gas turbine engine comprising:
a composite fan containment case including an outer surface, a front and a rear, the composite fan containment case includes multiple composite layers defining a generally cylindrical case;
an attachment flange and a mounting ring respectively provided on the front and the rear, the mounting ring is integral with the composite layers; and
a bolt attachment supported on the outer surface that includes an internal composite boss having at least one metallic insert, the boss attached to the outer surface with at least one fiber reinforce ply and an adhesive, and wherein the metallic insert includes a flat end that prevents rotation of the insert within the composite boss.

* * * * *